Patented June 8, 1948

2,443,024

UNITED STATES PATENT OFFICE 2,443,024

ETHERS FROM POLYFLUORO ACRYLONITRILES AND MONOHYDRIC ALCOHOLS

David W. Chaney, Nether Providence Township, Delaware County, Pa., assignor to American Viscose Corporation, Wilmington, Del., a corporation of Delaware No Drawing. Application September 10, 1946, Serial No. 696,027

10 Claims. (Cl. 260—464)

This invention relates to a new class of stable saturated ethers characterized by the formula

R—O—CF$_2$CHXR' where R represents the residue from an organic hydroxy compound, X is selected from the group consisting of chlorine and fluorine, and R' is selected from the groups C≡N and COOX' where X' is an alkyl radical.

The new ethers are colorless liquids which are stable to light and heat, variously soluble in the common organic solvents, and substantially insoluble in water. The ethers may be used as solvents or diluents with plastic coating compositions, and as chemical agents from which a number of other products may be prepared.

The saturated ethers of indicated structure may be obtained by the simple addition of the organic hydroxy compound to the double bond of a fluorinated acrylic acid derivative having the formula

CF$_2$=CXR' where X and R' have the same significance as above. Although an alkaline catalyst for the reaction may be useful in some cases, unexpectedly the addition generally takes place spontaneously. Thus, in the case of the primary alcohols, such as ethanol, methanol, propanol, butanol, etc., the alcohol adduct of the acrylic acid derivative is formed in the absence of a catalyst for the reaction, and under ordinary temperature and pressure conditions.

The following examples in which the parts are given by weight are illustrative of the invention.

Example I

About 8.8 parts of alpha-chloro-beta-difluoroacrylonitrile were added slowly to about 18 parts of ethanol in an Erlenmeyer flask with external cooling. After standing for about an hour, at room temperature, the mixture was poured into 200 parts of water, and the oil which separated was drown off, dried over anhydrous sodium sulfate and distilled at a pressure of 100 mm. 6.2 parts of ethyl difluorochloro-cyanoethyl ether (C$_2$H$_5$OCF$_2$CHClCN) were obtained — B. P. 93°/100 mm.

Example II 12.7 parts of a gaseous mixture of 40% (by weight) trifluoroacrylonitrile and 60% acetyl fluoride was passed slowly into 25 parts of ethanol, which was rapidly stirred in a glass apparatus. The temperature rose spontaneously to 35–40°. The addition was complete in less than one hour. When cool, the reaction mixture was poured into 100 parts of water. An oil separated and was washed again with water. It was then dried over sodium sulfate and distilled through a small fractionating column.

After a small forerun of ethyl acetate (formed by reaction of acetyl fluoride with the ethanol) 3.9 parts of ethyl trifluorocyanoethyl ether, C$_2$H$_5$OCF$_2$CHFCN, boiling from 120–122° were obtained.

Analysis—Found: N, 8.8; calc. for C$_5$H$_6$OF$_3$N: N, 9.1.

Ethers of other difluorinated acrylic acid derivatives having two fluorine atoms attached to a single carbon, such as alpha-fluoro-beta-difluoroalkyl acrylates; alpha-chloro-beta-difluoroalkyl acrylates, etc., may be obtained in similar manner.

Instead of the primary alcohols, other organic hydroxy compounds such as polyhydric alcohols and the higher polyoses of the type of cellulose, for instance, may be reacted with the acrylic acid derivatives to produce adducts in accordance with the invention.

This application is a continuation-in-part of my pending application, Serial No. 680,054, filed June 28, 1946, now Patent No. 2,439,505, issued April 13, 1948. Application Serial No. 680,054 discloses a method of preparing the fluorinated acrylonitriles utilized as starting materials for the production of the ethers disclosed herein which involves the steps of oxidizing a fluorochloro propylene to the corresponding propionyl chloride, converting the chloride to the corresponding amide, dehydrating the amide to the nitrile, and selectively dechlorinating the nitrile to the desired β-difluoro nitrile.

I claim:

1. An ether of the formula

R—O—CF$_2$CHXCN where R is an alkyl radical, and X is selected from the group consisting of chlorine and fluorine.

2. An ether of the formula

R—O—CF$_2$CHFCN where R is an alkyl radical.

3. An ether of the formula

R—O—CF$_2$CHClCN where R is an alkyl radical.

4. An ether of the formula

CH$_3$—O—CF$_2$CHFCN

5. An ether of the formula $$C_2H_5-O-CF_2CHFCN$$

6. An ether of the formula $$C_2H_5-O-CF_2CHClCN$$

7. The method of making a stable saturated ether of the formula $$R-O-CF_2CHXCN$$

where R is an alkyl radical, and X is selected from the group consisting of chlorine and fluorine, comprising the step of reacting a primary alcohol with a substance having the formula $$CF_2=CXCN$$

where X has the same significance as above, in the absence of a catalyst.

8. The method of making a stable saturated ether of the formula $$R-O-CF_2CHXCN$$

where R is an alkyl radical, and X is selected from the group consisting of chlorine and fluorine, comprising the step of reacting a primary alcohol with a substance having the formula $$CF_2=CXCN$$

where X has the same significance as above, in the absence of a catalyst and under atmospheric pressure.

9. The method of making an ether of the formula $$CH_3-O-CF_2CHXCN$$

where X is selected from the group consisting of chlorine and fluorine, which comprises the step of reacting a substance having the formula $$CF_2=CXCN$$

X having the same significance as above, with methanol, in the absence of a catalyst.

10. The method of making an ether of the formula $$C_2H_5-O-CF_2CHXCN$$

where X is selected from a group consisting of chlorine and fluorine, which comprises the step of reacting a substance having the formula $$CF_2=CXCN$$

X having the same significance as above, with ethanol, in the absence of a catalyst.

DAVID W. CHANEY.

REFERENCES CITED

The following references are of record in the file of this patent:

FOREIGN PATENTS

| Number | Country | Date |
| --- | --- | --- |
| 116,260 | Australia | Dec. 24, 1942 |

OTHER REFERENCES

Boeseken et al., Rec. Trav. Chim., vol. 32, pages 98–101 (1913).